E. M. SCHANTZ.
COMPUTING SCALE.
APPLICATION FILED MAR. 20, 1916.
1,292,085.
Patented Jan. 21, 1919.
2 SHEETS—SHEET 1.
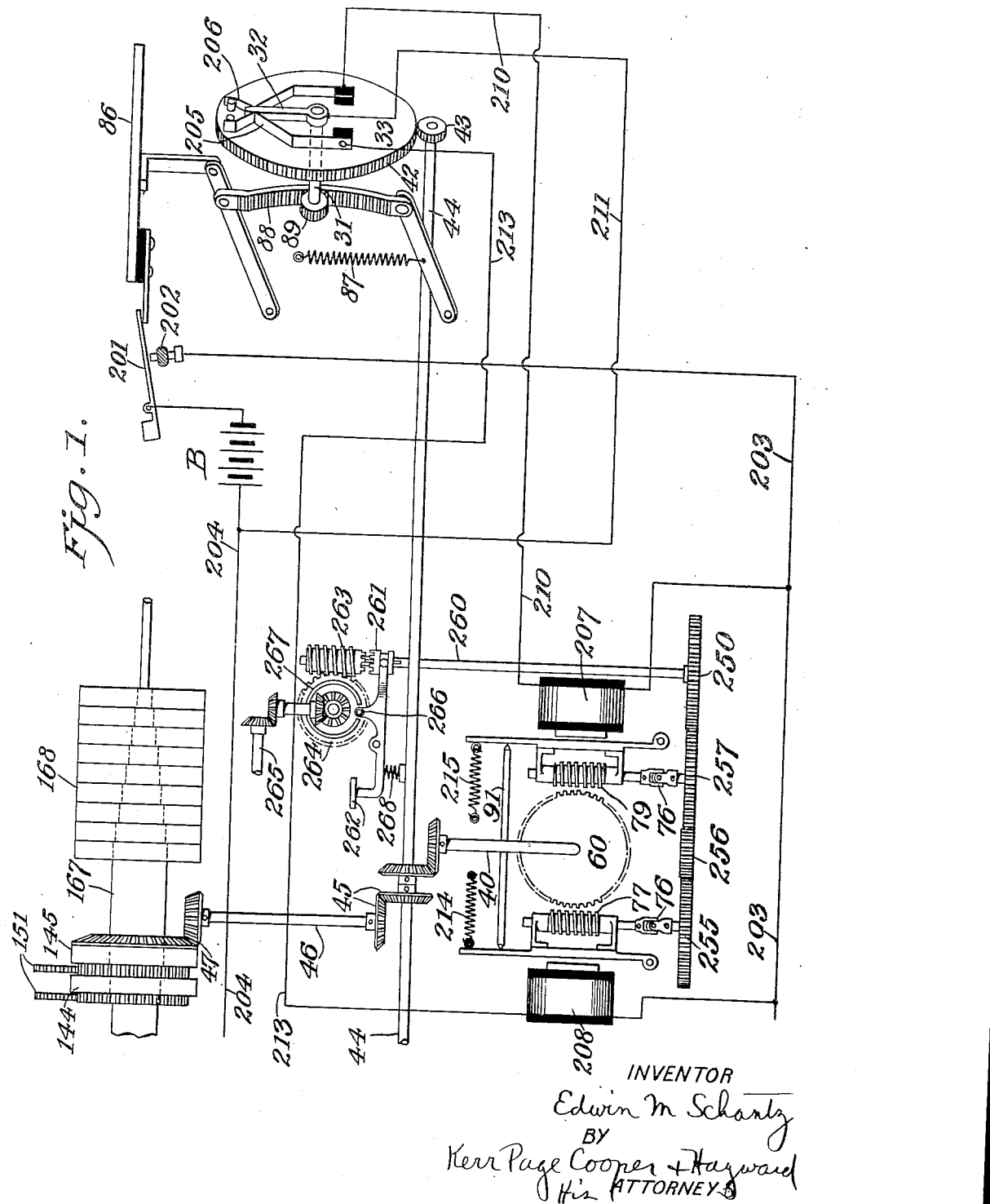
INVENTOR
Edwin M Schantz
BY
Kerr Page Cooper + Hayward
His ATTORNEYS

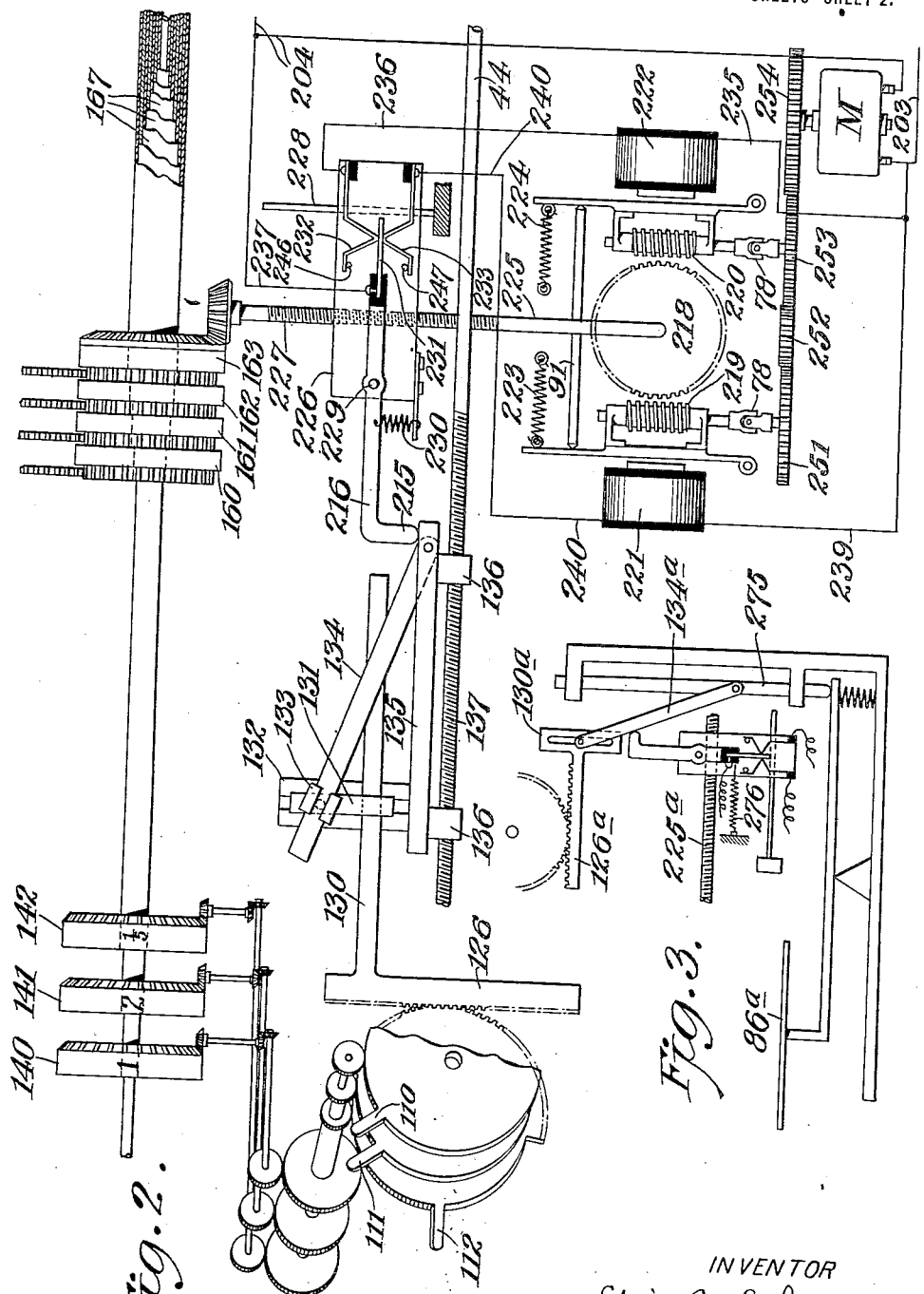

UNITED STATES PATENT OFFICE.

EDWIN M. SCHANTZ, OF CHICAGO, ILLINOIS, ASSIGNOR TO THE COMPUTING SCALE COMPANY, OF DAYTON, OHIO, A CORPORATION OF OHIO.

COMPUTING-SCALE.

1,292,085.

Specification of Letters Patent. Patented Jan. 21, 1919.

Application filed March 20, 1916. Serial No. 85,329.

*To all whom it may concern:*

Be it known that I, EDWIN M. SCHANTZ, a citizen of the United States, residing at Chicago, county of Cook, and State of Illinois, (and whose post-office address is 362 E. 61st street, Chicago, Ill.,) have invented certain new and useful Improvements in Computing-Scales, of which the following is a full, clear, and exact description.

This invention relates to certain new and useful improvements in computing scales and is particularly adapted for use in such scales where it is desired to obtain a record of the computed cost of a commodity weighed. My invention relates to an improved machine of the form shown in my copending applications Serial Nos. 695,879 and 84,019. The specific improvements in this application relate to improvements in the computing and pilot mechanisms whereby the minimum of power is necessary to drive the computing mechanism and in which pilot devices are employed in place of gear trains thereby improving the operation of the device. The scale is at all times free to move without any appreciable retardation whereby the accuracy of the scale is maintained. Other objects and advantages will be pointed out in the following specification and claims.

In the drawings:

Figure 1 shows a diagrammatic view of the scale, the pilot device to position the weight indicators, and the connections to the weight indicators. This view also shows the printing wheels and sectors and a portion of the clutch devices which connect with the printer impression taking means.

Fig. 2 shows a diagrammatic view of the computing mechanism, the computing pilot mechanism, the computed cost, and price per pound indicators and the nested sleeves connecting with the type sectors shown in Fig. 1.

Fig. 3 is a diagrammatic view of a modification.

Referring to Fig. 1, 86 is the scale pan or platform supported in any convenient manner as by the pivoted links. A spring 87 normally holds up the platform. Connected with the pivoted links is an arcuate rack 88 which meshes with a pinion 89 on shaft 31. These parts just described show somewhat diagrammatically an equilibrium machine which is adapted to have a varying displacement in accordance with varying loads thereon. It will be obvious that part 31 will assume varying angular positions in accordance with varying loads upon the pan 86 and in accordance with the extent of elongation of spring 87. Index 32 is rigid on the end of shaft 31 and extends between and separates two spring contacts 205 and 206. These contacts are carried on an insulated disk 33 which has secured thereto a spur gear 42. A pinion 43 meshes with the spur gear 42 and is carried on the end of a shaft 44 which extends to the left through the machine. The same shaft also extends through the other parts of the machine,— shown in Fig. 2.

Parts 201 and 202 represent a circuit interrupter which is open when there is no load upon the scale pan. As soon as a weight is placed upon the pan, an arm connected with the pan is lowered thereby permitting 201 to come into contact with 202 and close the battery circuit to battery B. Leading from the battery and contact 202 are two main leads 203, 204, which lead to the terminals of a motor M see Fig. 2. Accordingly current will be supplied to the motor and the motor will turn as long as a load is on the scale pan since contacts 201 and 202 are closed whenever a load is on the scale. The motor drives a series of intermeshed gears 251, 252, 253, 254, 255, 256, 257 and 250, see Figs. 1 and 2. It will be understood that gear 254 of Fig. 2 meshes with gear 255 of Fig. 1 and all the gears rotate in unison as long as the motor M rotates.

A wire 211 leads from one side of the battery to the index 32. Wire 210 leads from spring contact 206 and wire 213 leads from spring contact 205. These wires 210 and 213 lead to magnets 208 and 207. Adjacent these magnets are pivoted frames, which frames are normally drawn away from the magnets by springs 214 and 215. A space bar 91 extends between the frames and prevents a simultaneous inward movement of both frames. The frames form pivotal supports for worms 77 and 79 which are connected through universal joints 76 with the shafts of gears 255 and 257 respectively. The worms 77 and 79 are adapted to mesh with a worm hob 60 which hob through a shaft 40 and suitable bevel gears connects with shaft 44. Bevel gears 45, shaft 46, bevel gears 47 connect shaft 44 with suitable weight indicating wheels 144 and 145. These wheels are for pounds and ounces and are connected by a step by step transfer device shown diagrammatically at 151.

The operation of the parts so far described is as follows: A weight on pan 86 closes contacts 201 and 202 and the current supplied rotates motor M and through the gear train concurrently rotates the worms 77 and 79. At the same time index 32 is rotated clockwise, breaking contact with 205 and keeping on contact with 206. Suitable pins carried by the insulating disk 33 permit the movement of contacts 205 and 206 toward index 32. Current then flows from battery through 211, 32, 206, 210, energizing magnet 207 and back through 203, 202, 201 (now closed) to battery. The energization of magnet 207 holds worm 79 out of mesh with worm hob 60 but since current cannot flow from 32 to 205 magnet 208 is deënergized and spring 214 draws worm 77 into mesh with 60 and through parts 40, 44, 43, 42, turns insulated disk 33 clockwise until contact 205 catches up with 32. This energizes both magnets 208 and 207 holds both worms 77 and 79 out of mesh with 60 and stops rotation of 40 and shaft 44. The gear train 45, 46, 47, turns the weight indicators 144 and 145 proportionately to the rotation of disk 33 and thereby to an extent corresponding with the load on the scale. Taking weight off the scale reverses the operation until 201 breaks contact with 202. The above weighing and pilot devices operate in a similar manner to the pilot and weighing devices of my copending application Ser. No. 695,879, except that when in equilibrium index 32 is in contact with blades 205 and 206 and the circuits are interrupted when the scale moves from equilibrium.

*Computing mechanism.*

As previously pointed out shaft 44 has an extent of rotation proportional to the load on the scale. This shaft is therefore utilized to impart movement to the computing mechanism in accordance with and proportionately to the weight on the scale. For carrying out the computation, i. e. multiplication of price per pound by weight I employ the triangular computing member and the price per pound setting devices shown in my copending application, Ser. No. 84019. The setting devices are shown diagrammatically in Fig. 2. There are three of these setting devices 110, 111, 112, for tens, units and fractions of cents, and the arrangement of gearing therebetween is such that movement is imported to the setting devices of higher order from the lower order devices. In this way, a rack 126 meshing with gear teeth on the setting devices of highest order, is moved to an extent which is proportional to a summation of the movements of all the setting devices. This rack 126 has integral therewith a horizontal bar 130 which has slidably mounted a block 131. The block 131 is vertically slidable on a frame member 132 and has swiveled thereto a T slotted block 133 which engages the computing member 134. The computing member is in the form of a straight bar which is swiveled to a frame 135 which frame has depending portions 136 internally threaded to engage the threads 137 on the shaft 44. The computer and price setting elements so far described are identical with those described and claimed in my copending application and their operation is the same. It is sufficient to state that the price per pound setting determines the angularity of the computing member 134 (i. e. dependent upon the vertical position of bar 130). The weight on the scale controls the degree of rotation of shaft 44 and by means of the screw threads and the frame the shaft 44 advances or retracts the computing member 134 widthwise to an extent proportional to the weight on the scale. The shifting of the computing bar laterally does not affect the inclination of the member 134 since block 131 slides freely on 130.

The price setting devices 110, 111, 112, through suitable gearing connections shown in Fig. 2 turn the price per pound indicators 140, 141 and 142 to correspond with the price per pound set up.

*Computer pilot device.*

Part 226 represents a rectangular block which supports the pilot elements for the computer. This block is vertically guided upon a guide 228. The block is also threaded to receive threads 227 on a shaft 225. Upon turning the shaft 225 the threads 227 thereon lift or lower block 226. Pivoted on the block 226 at 229 is an index or finger 216 having a downwardly depending round nose 215. This nose is adapted to rest upon the computing member 134 closely adjacent the pivotal point as shown when there is no load on the scale. The opposite end of the index finger carries a blade 231 which is insulated from the body of the index. Spring contact blades 232, 233, are secured to block 225 and are shaped to contact with blade 231. Pins 246 and 247 limit the inward movement of these contact blades. A wire 237 leads from blade 231 to wire 204 which leads to the battery. Wire 236 leads from contact 232 to magnet 222 and wire 235 leads from this magnet to wire 203 which returns to the battery through circuit interrupter 201, 202. From contact blade 233 a wire 240 leads to magnet 221 whence wires 203, 239, lead back to 201, 202 to battery. Adjacent magnets 221 and 222 are pivoted frames which are normally drawn inward away from the magnets by springs 223, 224. Space bar 91 prevents both frames from moving inward at the same time. The frames form pivotal supports for worms 219 and 220 which worms through universal joints 78 connect with the shafts of driving gears 251 and 253. The worms 219 and 220 when drawn inward by their respective springs are adapted to mesh with worm hob 218 which is carried on shaft 225.

Operation.

Consider the computing member 134 angularly positioned by the price setting devices and a load on the scale. The shaft 44 then turns in accordance with and proportionally to the load on the scale in the manner previously explained. Turning shaft 44 draws computing member 134 to the right thereby rocking index 216 clockwise and breaking contact between blade 231 and contact 232. No current will now flow in wire 236 and magnet 222 will be deenergized thereby permitting spring 224 to draw worm 220 into engagement with worm hob 218. Shaft 225 then turns and by reason of threads 227 thereon lifts block 226. The upward movement of block 226 continues until index 216 is restored to normal position thus closing contact between 231 and 232 and thereby energizing magnet 222. The magnet disengages worm 220 from worm hob 218 and stops rotation of shaft 225 and the upward movement of block 226. During the aforesaid operation blade 231 has remained in contact with 233 thereby allowing current to flow through wire 240 which energizes magnet 221 and thereby holds worm 219 out of engagement with worm hob 218.

When the weight is removed from the scale or if the scale swings too far and then swings back a spring 230 draws the pivoted index down rocking it counterclockwise and breaks the contact between 231 and 233. This breaking of contacts deënergizes 221 and energizes 222 thereby allowing worm 219 to be drawn into engagement with worm hob 218 thereby driving shaft 225 in reverse direction and lowering block 226 until the index again assumes a horizontal position. When the index is in this position contacts 231, 232, 233 are closed.

When the contacts are all closed both magnets 221 and 222 are energized whereby both worms 219 and 220 are held from engagement with worm hob 218 thereby stopping the rotation of shaft 225.

By the above devices it will be seen that shaft 225 is rotated to an extent proportional to two factors, one the weight on the scale and the other the price per pound of the commodity weighed. Therefore, the rotation of this shaft is proportional to the computed cost of the commodity weighed. I therefore gear to the said shaft the computed cost indicators which are shown at 160, 161, 162 and 163. The shaft 225 is geared to the lowest order indicator and suitable transfer devices 164 are interposed between the different order indicators to impart movement from lower to high order indicators.

Connections to recorder.

In order to make a record of the transaction made upon the machine the price per pound indicators, the computed cost indicators, and the weight indicator are connected to nested sleeves 167 which in turn connect with type carriers 168. From these type carriers impressions are taken in any desirable manner. I may employ the impression taking means shown in my copending application Ser. No. 84,019; or I may employ the impression taking means shown in the patent to Cleal and Reinhard No. 580,378.

In order to drive the shaft or gear which drives the impression taking means I provide a clutch device which is adapted to connect the driving motor with the impression devices when it is desired to take a record.

Gear 250 rotates constantly with the other gears 251 and 257 driven by motor M. A shaft 260 extends upwardly from this gear and has splined thereto a clutch member 261 which is adapted to be thrown upwardly by manual pressure on a spring pressed key 262. When in upper position clutch member meshes with clutch elements on a worm gear 263 which enmeshes with a hob 264 which through suitable gearing drives shaft 265. This corresponds to shaft E of the Cleal and Reinhard patent or to the shaft carrying gear 295 of my co-pending application. The operating key carries a pin 266 which is engaged by a box cam 267 on the worm hob 264. In this way the clutch devices are held together for one complete rotation of the worm hob. After one rotation the spring 268 throws the pin out of the opening in the box cam and thereby disconnects the printer from the shaft 260.

In the modification shown in Fig. 3 rack 126ª is set up by suitable price per pound setting devices. The rack 126ª carries a slotted member 130ª which engages a pin on computing member 134ª which positions this member to an angular position corresponding to the price per pound. The weighing scale may be of the lever and spring type shown diagrammatically at 86ª. A vertically slidable rod 275 rests on the end of the lever and is elevated proportionally as a load is placed on the scale. The pilot device operates in a similar manner to the pilot device shown in Fig. 2 except that the placing of a load on the scale lifts the computing member 134ª and thereafter a spring 276 acts to rock the pilot index. Shaft 225ª connects with suitable computing cost indicators and type wheels not shown.

Weighing machines or equilibrium machines as I will hereinafter term them have weak inherent power. If an attempt is made to move a ponderous computing or computing recording mechanism by the power of the equilibrium machine, the action of the equilibrium machine will be interfered with to such an extent that inaccurate results will be displayed. By the present constructions above described I provide means for applying an auxiliary source of power, namely that of the motor M to drive the computing and recording machines. The scale or equilibrium machine only is called upon to move the light pilot device, i. e. part 32, and the slight power necessary to move this device does not in any way interfere with the accuracy of the weighing. It will be understood that various types of power mechanisms may be utilized to constitute the auxiliary source of power. My invention resides in the means for applying the power in such a way that the equilibrium machine is not unduly restrained in its movement.

I claim:—

1. In a computing scale, in combination, an equilibrium machine having a part adapted to be variably displaced in correspondence with varying loads to be weighed; a computing member adjustable in one direction in accordance with variable factors corresponding to price per unit weight and movable in another direction under the control of said variably displaceable part in accordance with variable factors corresponding to weight, whereby the resultants of the computing members movements represent the products of the variable factors; means for indicating the said products; and auxiliary-power mechanism controlled by the said resultant movements of the computing member to actuate the indicating means.

2. In a computing scale, in combination; an equilibrium machine; a computing machine comprised of a member adjustable in two directions; in one direction in accordance with price per pound, and in the other direction in accordance with the weight on the equilibrium machine; indicators and type carriers connected therewith; and auxiliary source of power; and means associated with the computing member to apply the power to move the said indicators and type carriers to an extent proportional to the product of price per pound and weight on the scale.

3. In a computing scale, in combination, an equilibrium machine having a part adapted to be variably displaced in correspondence with varying loads to be weighed; a computing machine operable in accordance with a predetermined price-rate and the displacement of said variably displaceable part, jointly; indicators to indicate the results of the computations performed by the computing machine; type wheels to print said results; auxiliary-power means to actuate the computing machine in accordance with the displacements of said variably displaceable part; and means for applying an auxiliary source of power to drive the indicators and type wheels in accordance with the movements of the computing machine.

4. In a computing scale, in combination; an equilibrium machine; a computing member adapted to be positioned in accordance with two factors, one the price per pound and the other the weight upon the equilibrium machine; auxiliary power means adapted to displace the said computing member in accordance with the last mentioned factor; indicators and type carriers, and pilot devices associated with the computing member to apply an auxiliary source of power to drive the indicator and type carriers in accordance with the position and displacement of the computing member.

5. In a computing scale, in combination; an equilibrium machine; a computing machine; a circuit interrupter associated with the equilibrium machine; a motor adapted to be connected with a source of power and rotate when the equilibrium machine moves from normal position; an index positioned by the equilibrium machine; a follow up mechanism comprising contacts coöperating with the index, a shaft to drive said follow up mechanism, and magnet means adapted to control the driving connection between the said shaft and motor upon the index moving away from and against the aforesaid contacts; a computing member displaced by the rotation of said shaft; means for variably setting the angularity of said computing member in accordance with the price per pound; indicators and type carriers; pilot devices in operative relation to the computing member, adapted to open and close circuits upon the movement of the computing member; and magnet devices adapted to control the driving connection between the aforesaid indicators and type carriers and the driving motor, whereby the computed cost is set up upon the indicators and type carriers.

6. In a device of the class described, in combination, an equilibrium machine; an auxiliary source of power; an index and follow up devices associated with the equilibrium machine; a to be controlled member; and means operable upon the breaking of the contact of the index and follow up device for connecting the aforesaid to be controlled member with the auxiliary source of power and to thereby control the extent of movement imparted to the to be controlled member.

7. In a device of the class described, in combination; an equilibrium machine, an auxiliary source of power; an index and follow up devices associated with the equilibrium machine; a to be controlled member; means operable upon relative movement of the index and follow up device for connecting the aforesaid to be controlled member with the auxiliary source of power, and to thereby control the extent of movement imparted to the to be controlled member in accordance with the displacement of the equilibrium machine; a set of to be positioned devices, an index and follow up devices actuated with the aforesaid controlled member and means operable upon relative movement between the index and follow up devices, imparted by the movement of the controlled member, for connecting the set of to be positioned devices with the auxiliary source of power whereby the said devices are moved to an extent determined by the controlled member.

8. In a device of the class described, in combination, an equilibrium machine; power supplying means adapted to be set in operation when the equilibrium machine moves from no load equilibrium; a main driving member; follow up and controlling devices adapted to control the extent of movement imparted to the said driving means by the power supplying means, in accordance with the displacement of the equilibrium machine; a computing member adapted to be variably positioned in accordance with the price per pound, and adapted to be displaced by the main driving member proportionally to the load on the equilibrium machine; indicators and type carriers; and follow up and controlling devices adapted to control, the extent of movement imparted to the said indicators and type carriers by the power supplying means in accordance with the position and displacement of the computing member, whereby the product of weight and price per pound is set up upon said type carriers and indicators.

9. In a device of the class described, in combination, an equilibrium machine; weight indicators; computed cost indicators; an index and follow up devices associated with the equilibrium machine; a source of power independent of the equilibrium machine; means operable upon a relative movement of the index and follow up devices for applying said power to drive the weight indicators to an extent proportional to the weight on the equilibrium machine; a computing member operated in unison with the aforesaid weight indicators and adapted to be variably positioned in accordance with the price per pound; and an index and follow up devices associated with the computing member for applying the aforesaid power to drive the computed cost indicators to an extent proportional to the weight on the equilibrium machine and the price per pound, to thereby indicate the computed cost.

10. In a device of the class described, in combination; an equilibrium machine; weight indicators; weight type carriers connected thereto; computed cost indicators; computed cost type carriers connected thereto; an index and follow up devices associated with the equilibrium machine; a source of power independent of the equilibrium machine; means operable upon a relative movement of the index and follow up devices for applying said power to drive the weight indicators and type carriers to an extent proportional to the load upon the equilibrium machine; a computing member operated in unison with the aforesaid weight indicators and to a proportional extent, said member being adapted to be variably positioned in accordance with the price per pound of the commodity weighed; and an index and follow up devices in operative association with the computing member for applying the aforesaid power to drive the computed cost indicators and the type carriers connected thereto, whereby the computed cost may be indicated and the type carriers set in position for taking a record of the computed cost therefrom.

11. In a device of the class described, in combination; an equilibrium machine; weight type carriers; computed cost type carriers, a source of power independent of the equilibrium machine; an index and follow up devices associated with the equilibrium machine, means operable upon a relative movement of the index and follow up devices for applying said power to drive the aforesaid type carriers to a position corresponding to the weight on the equilibrium machine; a computing member displaced by said power proportionally to the load on the equilibrium machine, said member being adapted to be variably positioned in accordance with the price per pound of the commodity weighed; an index and follow up devices in operative association with the computing member; and means associated therewith to apply the aforesaid power and turn the said computed cost type carriers to an extent proportional to the weight on the equilibrium machine and the price per pound, whereby said type carries are set in position for taking a record of the computed cost therefrom.

12. In a device of the class described, in combination, an equilibrium machine, computed cost type carriers, a computing member adapted to be positioned in accordance with the price per pound of the commodity weighed, and to be displaced proportionally to the load on the equilibrium machine by means controlled by the equilibrium machine; an index and follow up devices associated with the computing member; a source of power independent of the equilibrium machine; and means controlled by the aforesaid index and follow-up devices for applying the said power to turn the computed cost type carriers to an extent proportional to the load on the equilibrium machine and the price per pound, whereby the type carriers are set in position for taking a record of the computed cost therefrom.

13. In a computing scale, in combination, an equilibrium machine taking varying positions of displacement in accordance with varying loads thereon, a computing device adapted to be set to a particular price per pound and also adapted to be operated in accordance with the displacement of the equilibrium machine, said device being adapted, by said setting and operation, to mechanically multiply the price and weight and obtain computed cost, and a reading device adapted to be driven by a source of power independent of the power of the equilibrium machine for taking off from the said device a reading of computed cost.

14. An equilibrium machine having a variable displacement corresponding to varying weights thereon, a computing member adjustable in two directions, in one direction in accordance with the weight on the equilibrium machine and in the other direction in accordance with the price per pound of the commodity weighed, a source of power independent of the equilibrium machine, said source of power being adapted to move the computing member in one direction to an extent proportional to the weight on the equilibrium machine, indicators and type carriers, and means for applying an auxiliary source of power which is independent of the equilibrium machine to drive the said indicators and type carriers to an extent determined by the setting of the computing member in both directions.

In testimony whereof I hereunto affix my signature.

EDWIN M. SCHANTZ.